Figure 1:
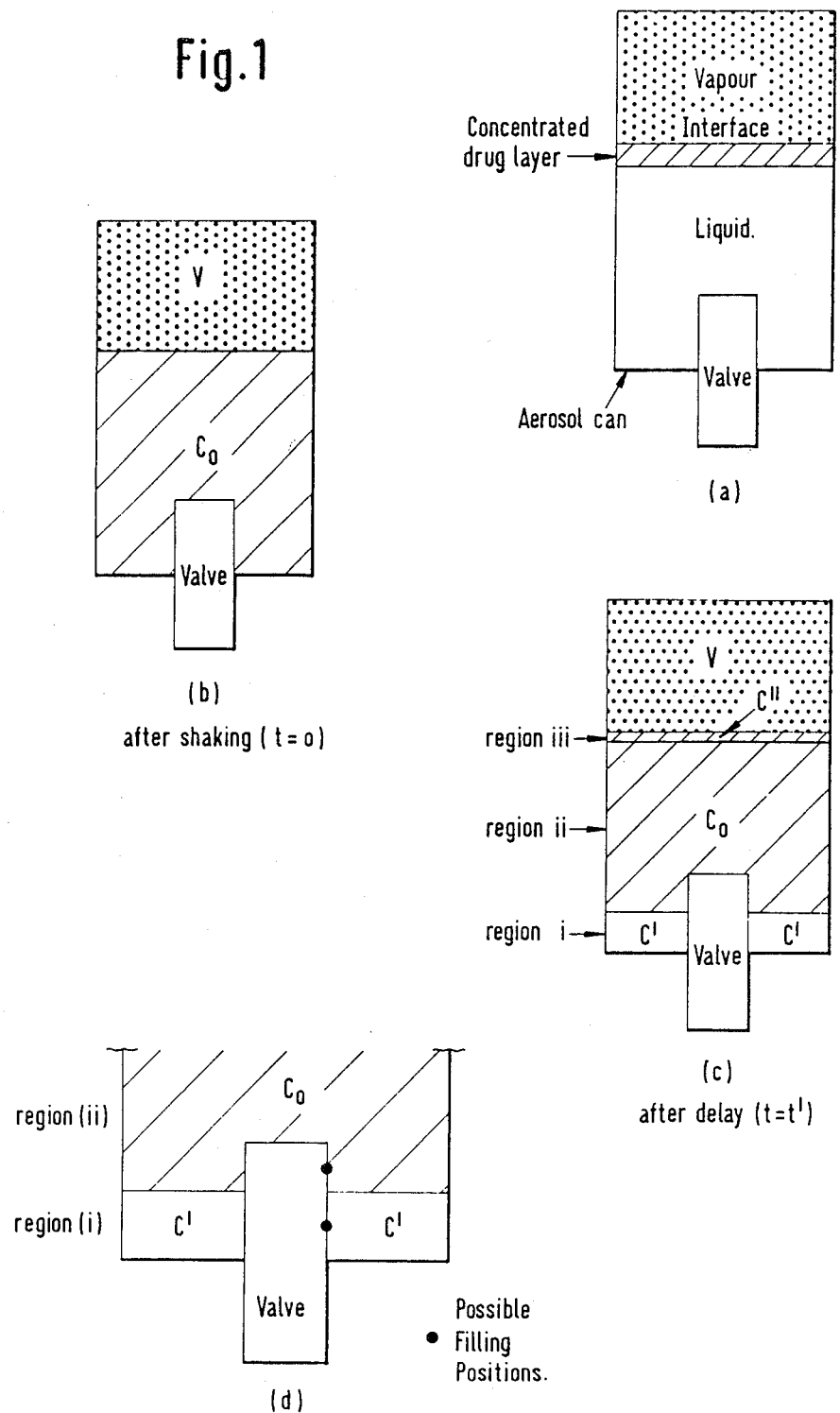

United States Patent [19]
Burt et al.

[11] Patent Number: 4,863,073
[45] Date of Patent: Sep. 5, 1989

[54] VALVE FOR AEROSOL CONTAINER

[75] Inventors: Peter C. W. Burt, Royston; Ian J. Smith, Harston; David A. Wyatt, Dry Drayton, all of England

[73] Assignee: Glaxo Group Limited, London, England

[21] Appl. No.: 108,729

[22] Filed: Oct. 14, 1987

[30] Foreign Application Priority Data

Oct. 15, 1986 [GB] United Kingdom ............... 8624670

[51] Int. Cl.⁴ .............................................. B65D 83/06
[52] U.S. Cl. .................................. 222/402.2; 222/453
[58] Field of Search ............ 222/402.2, 402.19, 402.1, 222/453; 128/200.23

[56] References Cited

U.S. PATENT DOCUMENTS

| | | | |
|---|---|---|---|
| 1,947,310 | 2/1934 | Sample et al. | 221/103 |
| 3,404,681 | 10/1968 | Fowler | 128/200.23 |
| 3,587,929 | 6/1971 | Usen et al. | 222/402.19 |
| 3,591,059 | 7/1971 | Stearns | 222/402.2 |
| 4,433,797 | 2/1984 | Galia | 222/402.2 X |

FOREIGN PATENT DOCUMENTS

| | | |
|---|---|---|
| 143577 | 6/1985 | European Pat. Off. |
| 1299724 | 6/1962 | France ............... 222/402.2 |
| 456372 | 1/1970 | Japan ................. 222/402.2 |
| 830427 | 3/1960 | United Kingdom . |
| 1201918 | 8/1970 | United Kingdom . |
| 2178398 | 2/1987 | United Kingdom . |

OTHER PUBLICATIONS

Bespak BK 300 Pressure Filling Valve.

Primary Examiner—Michael S. Huppert
Attorney, Agent, or Firm—Darby & Darby

[57] ABSTRACT

A valve is provided for dispensing metered doses from an aerosol container, which contains a substance to be dispensed suspended in a liquid propellant. The valve comprises a valve body (2, 3), first and second valve seals (6,7) at opposite ends of the valve body (2,3), and a valve stem (5) having an outlet (18) and a transfer port (19) extending from the exterior of the valve stem (5) to the outlet (18). A metering chamber (4) is defined by the internal wall of the valve body (2,3), the first and second valve seals (6,7) and the portion of the valve stem (5) within the cavity. The valve stem (5) is biased to a position in which, when the container is orientated with the valve at the bottom, liquid can enter the metering chamber through at least one orifice (12) which communicates with the interior of the container at a location which, when the container is orientated with the valve at the bottom, is an appreciable distance above the nearest surface which is horizontal or has an appreciable horizontal component. The orifice (12) is directed transversely with respect to the direction of movement of the valve stem (5).

4 Claims, 3 Drawing Sheets

VALVE FOR AEROSOL CONTAINER

This invention relates to a dispensing valve with the aid of which a metered dose of the contents of an aerosol container can be dispensed. The invention has particular application to the dispensing of medicaments, though it is applicable to the dispensing of aerosols generally.

In dispensing a solid in aerosol form it is common to use what is known as a suspension aerosol. This involves the use of a liquid propellant in which a solid to be dispensed is suspended. There is inevitably some difference, however slight, between the respective specific gravities of the propellant and the solid to be dispensed, which means that, with the passage of time, and in the absence of other overriding interactions the two components tend to separate in the container, with the lighter component going to the top and the heavier component going to the bottom. The behaviour of an individual particle in such a system is described by the well known Stokes Relation.

$$V = \frac{2gr^2(\rho_p - \rho_l)}{9\eta}$$

Where
- V is the sedimentation rate (downward movement) or creaming rate (upward movement) of the dispersed particles
- g is the gravitational acceleration
- $\rho_p$ is the density of the solid
- $\rho_l$ is the density of the liquid
- r is the radius of the individual particle
- $\eta$ is the viscosity of the liquid.

In many pharmaceutical aerosols the particles of medicament are less dense than the propellant and hence the dominant phenomenon is "creaming". This phenomenon may be accentuated by the additional structuring of the medicament presentation necessary to enhance its physical stability, for example by controlled flocculation thereof. Controlled flocculation of the suspension may increase the effective particle size in dispersion from <10 μm to >100 μm. A squared dependency on particle radius will dramatically increase the creaming rate in such circumstances.

Users of suspension aerosols are always instructed to shake the container well before use. However, even a short interval between the conclusion of the shaking and the act of dispensing a charge from the aerosol is sufficient to allow some creaming to occur. This represents a particular problem where the suspended material is a medicament, since it can result in the patient receiving a dose which, although of the correct volume, contains either too little or too much of the medicament. It is an object of the present invention to provide a valve which avoids or at least alleviates this problem.

According to the present invention there is provided a valve for dispensing metered doses from an aerosol container, which contains a substance to be dispensed suspended in a liquid propellant, which comprises a valve body having an internal wall defining a cavity therein, first and second valve seals at opposite ends of the cavity, and a valve stem having an outlet through which a dose can be dispensed from the container and a transfer port extending from the exterior of the valve stem to the outlet thereof, the valve stem passing in sliding and sealing contact through an opening in the first valve seal into the cavity, a metering chamber being defined exclusively, or substantially exclusively, by the said internal wall of the valve body, the first and second valve seals and the portion of the valve stem within the cavity, the valve stem being biased to a first position in which, when the container is orientated with the valve at the bottom, liquid can enter the metering chamber through at least one orifice, and being movable against said bias into a second position in which the valve stem closes off the opening in the second valve seal to prevent further liquid entering the metering chamber and in which the transfer port is in communication with the metering chamber to permit liquid to pass from the metering chamber into the outlet of the valve stem, the or each said orifice communicating with the interior of the container at a location which, when the container is orientated with the valve at the bottom, is an appreciable distance above the nearest surface which, in use, is horizontal or has an appreciable horizontal component.

Preferably the above mentioned appreciable distance is at least 3.5 mm, more preferably at least 5 mm. An alternative measure of the desired distance is that it is preferably at least equal to the creaming rate of the suspension in distance/sec multiplied by 3 sec and more preferably multiplied by 5 sec.

A general concern in the design of aerosol valves is to ensure that as much as possible of the contents of an aerosol container can be dispensed. Accordingly, it is general for aerosol valves to be designed so that the pick-up point, i.e. the point at which liquid passes from the interior of the container into the valve, is at a location which when the container is inverted, is as low as possible. It will be appreciated that the present invention goes against this trend by deliberately placing the point at which the valve communicates with the interior of the container at a point which is appreciably above the lowest point in the container, i.e. a high pick-up point. This necessarily has the consequence that some of the contents of the container cannot be dispensed, but this is more than compensated for by the reduction in the effect which creaming has on the composition of the liquid entering the metering chamber. Furthermore, the amount of liquid which cannot be dispensed can be made quite small by so designing the valve and the container that the radial distance therebetween is small.

In the accompanying drawings:

FIGS. 1a to 1d illustrate the creaming phenomenon in diagrammatic form; and FIGS. 2 and 3 illustrate two embodiments of the invention.

FIG. 1a shows that initially, in the undisturbed state, all the medicaments may cream to the interface between the propellant liquid and vapour, to form a concentrated layer.

As shown in FIG. 1b, immediately after shaking, the medicament will be evenly distributed in the liquid propellant giving a uniform medicament concentration $C_o$ throughout the system. After some delay time t′ prior to actuation of the valve the medicament distribution within the liquid medium will no longer be uniform. The creaming phenomenon will cause the medicament particles to partition between three regions, namely:

(i) A lower layer (concentration C′)

(ii) An intermediate phase with concentration $C_o$ (iii) An upper layer at the interface with a high concentration, C''.

This is shown in FIG. 1c. After actuation of the valve, the metering chamber may fill from either region (i) or (ii) dependent upon the position of the metering chamber pick-up point, i.e. the location from which metering chamber fills. If the metering chamber fills from region (i) the valve will deliver a lower than standard dose of medicament. If the metering chamber fills from region (ii) the correct dose will be delivered.

A somewhat similar situation will be encountered for the situation in which the medicament is denser than the propellant medium. The schematic picture presented in FIG. 1 would however be inverted due to sedimentation with the most concentrated region of the medicament dispersion a the base of the container. In this situation the metering chamber may only fill from either a region of the correct concentration or a more concentrated region dependent upon the position of the metering chamber pick-up point.

By way of numerical example, the creaming rate of particles of effective radius 100 μm of the drug salbutamol (density $1.17 \times 10^3$ kg m$^{-3}$) in a mixture of the propellants Arcton 11 (trichlorofluoromethane) and Arcton 12 (dichlorofluoromethane), such a propellant mixture having a density of $1.35 \times 10^3$ kg m$^{-3}$ and a viscosity of 0.003 poise) is $1.31 \times 10^{-3}$ m/sec. The term "effective radius" is used as meaning the radius appropriate for insertion in the Stokes equation set out above. The actual radius which corresponds to this effective radius may be rather different since the Stokes equation assumes that the particles are spherical and ignores interactions between the particles and the suspension medium and between the particles themselves. For the same propellant mixture and particle size comparable creaming rates for some other drugs are:

| | |
|---|---|
| Salbutamol sulphate (density $1.32 \times 10^3$ kg m$^{-3}$) | $2.18 \times 10^{-4}$ m/sec. |
| Beclomethasone dipropionate (density $1.165 \times 10^3$ kg m$^{-3}$) | $1.34 \times 10^{-3}$ m/sec. |
| Betamethasone 17-valerate (density $1.27 \times 10^3$ Kg m$^{-3}$) | $5.81 \times 10^{-4}$ m/sec. |

By way of further illustrating the theoretical basis underlying the present invention the following table sets out the creaming distance for various sizes of particles of drugs of various densities in a propellant having a density of $1.35 \times 10^3$ kg m$^{-3}$ and a viscosity of 0.003 poise. The distances are those covered by particles in 2, 5 and 10 second intervals respectively.

| | (a) Two second interval | | |
|---|---|---|---|
| | CREAMING DISTANCE/m | | |
| Effective Radius | Drug Density/kg m$^{-3}$ | | |
| of Particle/μm | $1.0 \times 10^3$ | $1.1 \times 10^3$ | $1.2 \times 10^3$ |
| 1 | $5.1 \times 10^{-7}$ | $3.6 \times 10^{-7}$ | $2.2 \times 10^{-7}$ |
| 25 | $3.2 \times 10^{-4}$ | $2.3 \times 10^{-4}$ | $1.4 \times 10^{-4}$ |
| 50 | $1.3 \times 10^{-3}$ | $9.1 \times 10^{-4}$ | $5.5 \times 10^{-4}$ |
| 75 | $2.9 \times 10^{-3}$ | $2.0 \times 10^{-3}$ | $1.2 \times 10^{-3}$ |
| 100 | $5.1 \times 10^{-3}$ | $3.6 \times 10^{-3}$ | $2.2 \times 10^{-3}$ |
| | (b) Five second interval | | |
| | CREAMING DISTANCE/m | | |
| Effective Radius | Drug Density/kg m$^{-3}$ | | |
| of Particle/μm | $1.0 \times 10^3$ | $1.1 \times 10^3$ | $1.2 \times 10^3$ |
| 1 | $1.3 \times 10^{-6}$ | $9.3 \times 10^{-7}$ | $5.5 \times 10^{-7}$ |
| 25 | $8.0 \times 10^{-4}$ | $5.7 \times 10^{-4}$ | $3.4 \times 10^{-4}$ |
| 50 | $3.2 \times 10^{-3}$ | $2.3 \times 10^{-3}$ | $1.4 \times 10^{-3}$ |
| 75 | $7.2 \times 10^{-3}$ | $5.1 \times 10^{-3}$ | $3.1 \times 10^{-3}$ |
| 100 | $1.3 \times 10^{-2}$ | $9.1 \times 10^{-3}$ | $5.5 \times 10^{-3}$ |
| | (c) Ten second interval | | |
| | CREAMING DISTANCE/m | | |
| Effective Radius | Drug Density/kg m$^{-3}$ | | |
| of Particle/μm | $1.0 \times 10^3$ | $1.1 \times 10^3$ | $1.2 \times 10^3$ |
| 1 | $2.5 \times 10^{-6}$ | $1.8 \times 10^{-6}$ | $1.1 \times 10^{-6}$ |
| 25 | $1.6 \times 10^{-3}$ | $1.1 \times 10^{-3}$ | $6.8 \times 10^{-4}$ |
| 50 | $6.4 \times 10^{-3}$ | $4.5 \times 10^{-3}$ | $2.8 \times 10^{-3}$ |
| 75 | $1.4 \times 10^{-2}$ | $1.0 \times 10^{-2}$ | $6.1 \times 10^{-3}$ |
| 100 | $2.5 \times 10^{-2}$ | $1.8 \times 10^{-2}$ | $1.1 \times 10^{-2}$ |

For completeness it should be pointed out that the explanation given above with reference to FIG. 1 is somewhat simplified in that the boundaries between the various layers are not generally as sharp as illustrated, but the explanation is believed nevertheless to be qualitatively correct.

Figure 2:
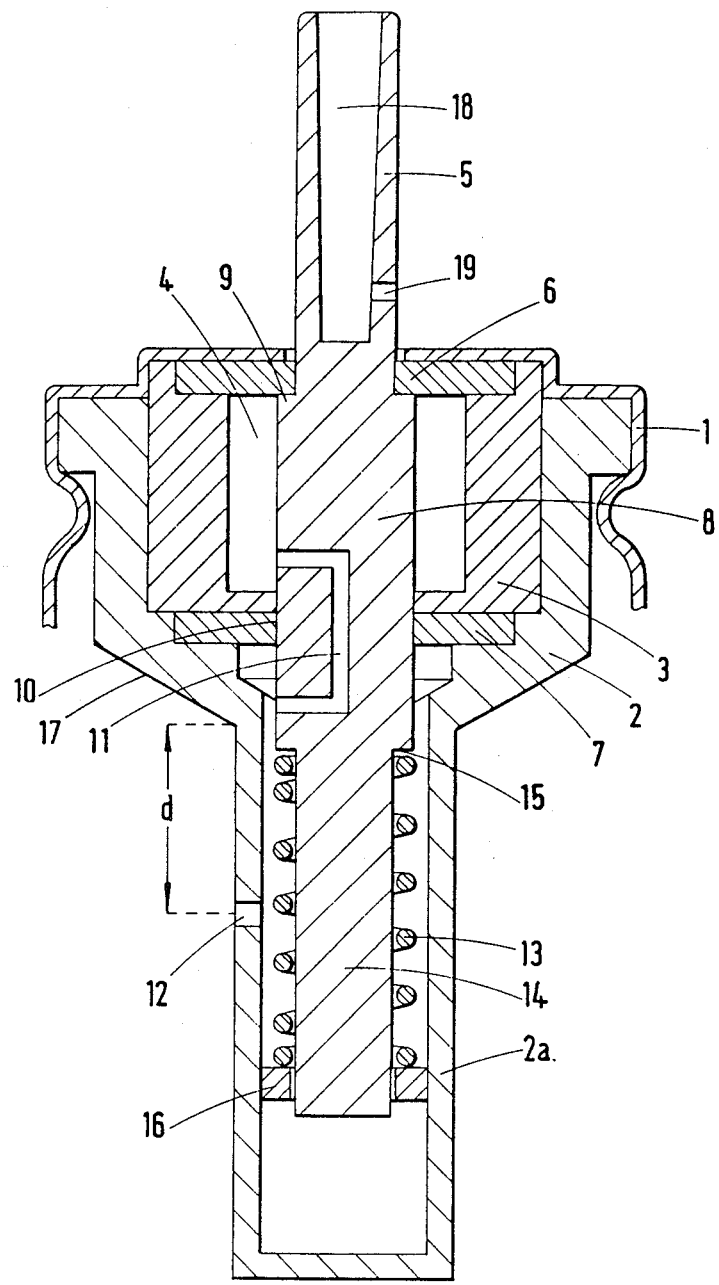

In the arrangement according to the invention illustrated in FIG. 2, a metering valve is fitted in a ferrule or cap of an aerosol container. The container contains a material to be dispensed in a volatile liquid propellant. When the device is not being used, the container may be placed with the valve uppermost. This is with the various parts of the valve in the position shown in the drawing. When the device is in use, the container is inverted from this position.

The valve comprises a valve body which comprises a cup 2 fitted in the container cap 1. The valve body further comprises a bush 3 which fits in the cup 2 and defines a metering chamber 4 which is fixed with respect to the container 1 and has a constant volume. A valve stem 5 extends through the chamber 4 and into a lower extension 2a of the cup 2. A first valve seal 6 is provided at the top of the bush 3 and a second valve seal 7 is provided immediately below the bottom of the bush. The first valve seal 6 has an opening in which the valve stem makes a sealing fit, and through which the valve stem 5 can slide.

The valve stem 5 carries a valve member 8 having an upper shoulder 9 which can make sealing contact with the underside of the first or upper valve seal 6 as shown in the drawing. The upper portion of the valve member 8 has a diameter such that it can pass slidably through an opening 10 in the second or lower valve seal 7 and will engage the periphery of that opening sufficiently to provide a seal. The valve stem 5 has a passage 11 which, when the stem is in the inoperative position shown, communicates the metering chamber 4 with the region surrounding the lower portion of the valve member 8, and thence with the interior of the container via an orifice 12 formed in the side of the cup extension 2a, i.e. directed transversely with respect to the direction of movement of the valve stem. The passage 11 is of capillary dimensions, e.g. 0.5 mm in diameter, so that with the container in the illustrated upright position liquid in the chamber 4 is unable to drain through the passage 11 under the force of gravity.

The valve stem 5 is urged to the inoperative position shown in the drawings by a coil spring 13 surrounding a lower guide portion 14 of the valve stem 5. The spring 13 bears between a shoulder 15 on the valve stem and an inwardly directed annular flange 16 in the cup extension 2a.

The valve stem 5 has an outlet passage 18 through which a charge can be dispensed from the metering chamber 4, such charge entering the outlet passage 18 through a transfer port 19 when the valve stem has been moved to an operative position.

There is normally a charge of liquid in the metering chamber. To use the device the container is inverted and shaken and the valve stem 5 is then depressed against the force of the spring 13. When the valve stem 5 is depressed both ends of the passage 11 come to lie on the side of valve seal 7 remote from the chamber 4 so that no more of the contents of the container can enter the chamber 4. Thus, a dose is metered. Continued depression of the valve stem will move the transfer port 19 into the chamber 4 while the valve member 8 still remains as a seal fit in the opening 10. Thus, the metered dose can exit through the transfer port 19 and the outlet passage 18. Releasing the valve stem 5 causes it to return to the illustrated position (but inverted) under the force of the spring 13. The passage 11 then once again provides communication between the chamber and the interior of the cup extension 2a. Accordingly, at this stage liquid passes under pressure from the interior of the container, through the orifice 12, through the passage 11 and thence into the chamber 4 to fill it.

It will be understood that with the container inverted the orifice 12 is an appreciable distance d above nearest surface thereto which is horizontal or has an appreciable horizontal component, in this case the sloping shoulder 17 where the cup extension 2a joins the remainder of the cup. The point to be kept in mind is that particles will cream away from any surface which is not vertical. By virtue of the distance d, liquid entering the metering chamber following a dispensing operation comes from above the nearest region of the liquid where creaming occurs during the period t between when the user ceases shaking the container and when he releases the valve stem. The distance d is therefore chosen in accordance with the criteria set out above.

Figure 3:
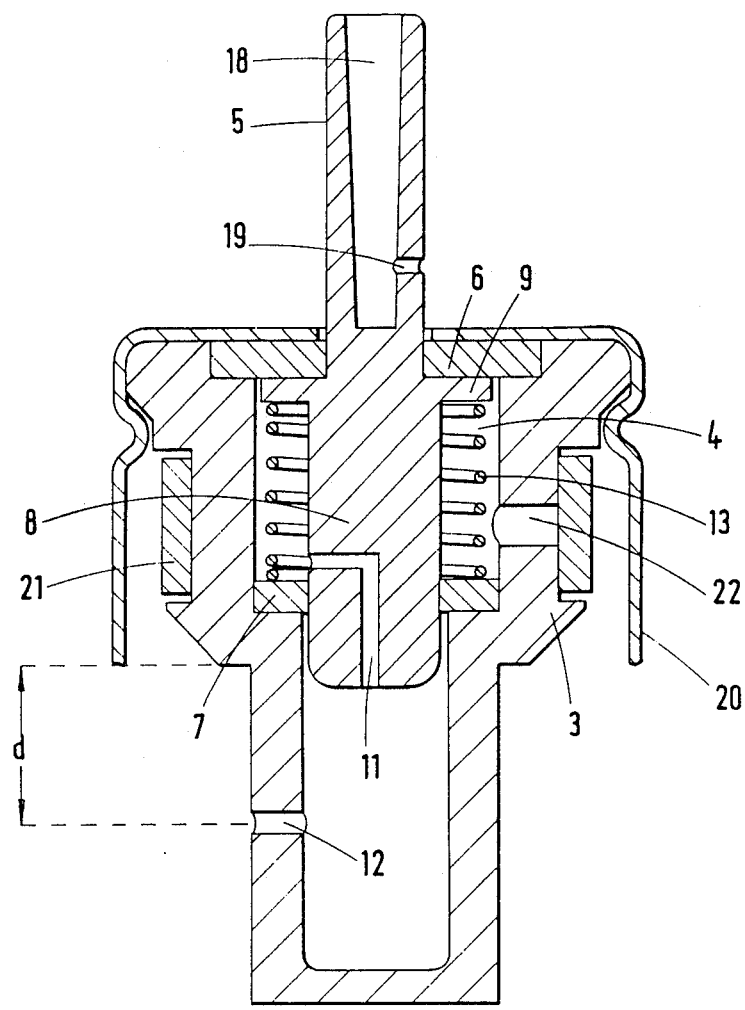

In the embodiment illustrated in FIG. 3, in which the same reference numerals are used to designate similar elements, the passage 11 is formed in the lower end of the valve member 8, the guide portion 14 is omitted, and the lower valve seal 7 and the return spring 13 are arranged inside the metering chamber 4. The valve bush 3 is secured in a ferrule or cap 20 of a container. It should be explained that reference numeral 21 denotes a resilient band which closes off a filling aperture 22. When the container is being filled, prior to use, the stem 5 is depressed, and propellant under pressure passes through the passage 18, the transfer port 19, the metering chamber 4, the port 22 and past the band 21, which moves out of sealing contact with the end of the port 22 under the pressure of the propellant, and thence into the interior of the container. During subsequent use of the filled container the band 21 keeps the port 22 closed and plays no further part in the operation of the device.

The embodiments shown in FIGS. 2 and 3 of the accompanying drawings are based on the designs shown in GB-A-2004526, modified to incorporate a high pick-up point. However, other valve designs can be similarly modified, for example those shown in GB-A-798169 (Risdon Manufacturing Company), GB-A-1201918 and GB-A-1201919 (Bespak Industries Limited), GB-A-2178398 and EP-A-191614 (Bespak plc), GB-A-1287126 and GB-A-1336379 (Neotechnic Engineering Limited) and GB-A-2049064 (Etablissements Valois SA), and also those sold as the BK356 by Bespak plc of Kings Lynn, Norfolk, England, the 63mcl Spraymiser by Neotechnic Engineering Limited of Clitheroe, Lancashire, England, and the DF60 by Etablissements Valois SA of Le Prieure, 27110 Le Neubourg, France.

We claim:

1. An aerosol container, a substance to be dispensed suspended in a liquid propellant in said container, and a valve for dispensing metered doses from said aerosol container, said valve comprising a valve body having an internal wall defining a cavity therein, first and second valve seals at opposite ends of the cavity, and a valve stem having an outlet through which a dose can be dispensed from the container and a transfer port extending from the exterior of the valve stem to the outlet thereof, the valve stem passing in sliding and sealing contact through metering chamber being defined exclusively, or substantially exclusively, by the said internal wall of the valve body, the first and second valve seals and the portion of the valve stem within the cavity, the valve stem being biased to a first position which, when the container is orientated with the valve at the bottom, liquid can enter the metering chamber through at least one orifice, and being movable against said bias into a second position in which the valve stem closes off the opening in the second valve seal to prevent further liquid entering the metering chamber and in which the transfer port is in communication with the metering chamber to permit liquid to pass from the metering chamber into the outlet of the valve stem, the or each said orifice communicating with the interior of the container at a location which, when the container is orientated with the valve at the bottom, is spaced an appreciable distance from the nearest surface which, in use, is horizontal or has an appreciable horizontal component to substantially reduce or eliminate the effect of creaming, said appreciable distance being at least 3.5 mm.

2. An aerosol container, a substance to be dispensed suspended in a liquid propellant in said container, and a valve for dispensing metered doses from said aerosol container, said valve comprising a valve body having an internal wall defining a cavity therein, first and second valve seals at opposite ends of the cavity, and a valve stem having an outlet through which a dose can be dispensed from the container and a transfer port extending from the exterior of the valve stem to the outlet thereof, the valve stem passing in sliding and sealing contact through an opening in the first valve seal into the cavity, a metering chamber being defined exclusively, or substantially exclusively, by the said internal wall of the valve body, the first and second valve seals and the portion of the valve stem within the cavity, the valve stem being biased to a first position in which, when the container is orientated with the valve at the bottom, liquid can enter the metering chamber through at least one orifice, and being movable against said bias into a second position in which the valve stem closes off the opening in the second valve seal to prevent further liquid entering the metering chamber and in which the transfer port is in communication with the metering chamber to permit liquid to pass from the metering chamber into the outlet of the valve stem, the or each said orifice communicating with the interior of the container at a location which, when the container is orientated with the valve at the bottom, is spaced an appreciable distance from the nearest surface which, in use, is horizontal or has an appreciable horizontal component to substantially reduce or eliminate the effect of creaming, said appreciable distance being at least 5 mm.

3. An aerosol container, a substance to be dispensed suspended in a liquid propellant in said container, and a valve for dispensing metered doses from said aerosol container, said valve comprising a valve body having an internal wall defining a cavity therein, first and second valve seals at opposite ends of the cavity, and a valve stem having an outlet through which a dose can be dispensed from the container and a transfer port extending from the exterior of the valve stem to the outlet thereof, the valve stem passing in sliding and sealing contact through an opening in the first valve seal into the cavity, a metering chamber being defined exclusively, or substantially exclusively, by the said internal wall of the valve body, the first and second valve seals and the portion of the valve stem within the cavity, the valve stem being biased to a first position in which, when the container is orientated with the valve at the bottom, liquid can enter the metering chamber through at least one orifice, and being movable against said bias into a second position in which the valve stem closes off the opening in the second valve seal to prevent further liquid entering the metering chamber and in which the transfer port is in communication with the metering chamber to permit liquid to pass from the metering chamber into the outlet of the valve stem, the or each said orifice communicating with the interior of the container at a location which, when the container is orientated with the valve at the bottom, is spaced an appreciable distance from the nearest surface which, in use, is horizontal or has an appreciable horizontal component to substantially reduce or eliminate the effect of creaming, said appreciable distance being at least equal to the creaming rate of the suspension in distance/second multiplied by three seconds.

4. An aerosol container according to claim 3, wherein the said appreciable distance is at least equal to the creaming rate of the suspension in distance/second multiplied by 5 seconds.

* * * * *